United States Patent
Mott

Patent Number: 5,154,280
Date of Patent: Oct. 13, 1992

[54] SKIRTBOARD SYSTEM FOR CONVEYORS

[75] Inventor: George T. Mott, Macungie, Pa.

[73] Assignee: Asgco Manufacturing, Inc., Allentown, Pa.

[21] Appl. No.: 768,688

[22] PCT Filed: Mar. 7, 1990

[86] PCT No.: PCT/US90/01237

§ 371 Date: Oct. 11, 1991

§ 102(e) Date: Oct. 11, 1991

[51] Int. Cl.[5] .............................................. B65G 47/04
[52] U.S. Cl. ....................................... 198/525; 198/540; 198/836.1
[58] Field of Search ....................... 198/525, 540, 836.1

[56] References Cited

U.S. PATENT DOCUMENTS

| | | | |
|---|---|---|---|
| 873,748 | 12/1907 | Henson | 198/525 |
| 1,288,832 | 12/1918 | Carr | 198/525 |
| 3,097,734 | 7/1963 | Erickson | 198/540 |
| 3,990,588 | 11/1976 | Dibben | 198/540 X |
| 4,236,628 | 12/1980 | Stahura | 198/525 |
| 4,518,498 | 5/1985 | Monteyne | 198/525 X |
| 4,874,082 | 10/1989 | Swinderman | 198/836 |
| 4,877,125 | 10/1989 | Gordon | 198/525 X |
| 5,048,669 | 9/1991 | Swinderman | 198/525 |

Primary Examiner—Robert P. Olszewski
Assistant Examiner—Cheryl L. Gastineau
Attorney, Agent, or Firm—Dann, Dorfman, Herrell and Skillman

[57] ABSTRACT

A conveyor system having a conveyor belt (21) having a substantially horizontal segment with hopper walls (26) overlying the segment and providing a hopper channel (25) terminating at a distance above the belt to provide clearance space below the hopper walls, and a skirtboard (74) mounted on the hopper walls, projecting into the clearance spaces and terminating in flexible sealing flaps (75) confronting the upper surface of the belt (21) to limit the flow of particulate material (M) through the clearance space. The hopper walls (26) have upwardly-directed guide tracks (37) on their outward sides to receive elongated slides (44) for longitudinal displacement in the associated track (37). The skirtboard (74) extends transversely to and between adjacent slides (44) to position its flexible sealing flaps (75) in confronting relation to the conveyor (21). A bracket (54) is pivotally supported (47) by the slide (44) to mount the skirtboard (74) and has a releasable latch (55) to forcibly engage the skirtboard (74) with the hopper wall adjacent the lower edge (27) thereof. The skirt (75) may be adjusted by temporarily releasing the latches (55).

13 Claims, 2 Drawing Sheets

SKIRTBOARD SYSTEM FOR CONVEYORS

FILED OF THE INVENTION

The present invention relates to conveyor systems for handling particulate material and has particular application to the skirtboard apparatus for providing a seal between the feed hopper or chute and the conveyor belt at the feed point(s) of a conveyor system.

BACKGROUND OF THE INVENTION

In conventional conveyor systems, particularly systems for transporting bulky aggregates such as coal, iron ore, and the like, the feed material is subject to considerable spillage at the feed point(s) of the conveyor system where the hopper is designed to deposit the particulate material on the conveyor belts. The hopper normally discharges the particulate material onto a horizontal or inclined segment of the conveyor belt system at the feed point(s), and in order to limit the spillage of material, flexible skirts or skirtboards are provided to bridge the gap between the lower end of the hopper and the conveyor surface. In view of the abrasive nature of the material normally conveyed, and the need for the conveyor belts to travel under the skirts in contact with the flexible edges of the skirt, the skirts are subject to considerable wear and there is ample opportunity for the particulate material to displace the skirts and spill out over the edges of the conveyor at the feed end. To reduce the tendency for spillage, wear liners have been mounted on the inside walls of the hopper to direct the particulate material toward the center of the conveyor belt.

Not only is there a tendency for the particulate material being conveyed to spill out between the skirt and the conveyor, at the feed hopper or chute there is considerable dust and fine material which tends to migrate into the operating parts at the feed end of the conveyor and cause problems with the proper operation of such parts.

Even with the use of a liner on the inner surface of the hopper walls, there is still a tendency for the particulate material to gravitate outwardly under the liner and the lower edge of the hopper wall, and to foul the roller mechanisms or other devices supporting the belt. To overcome this, it has been the practice to provide an adjustable skirt on the outside of the hopper wall positioned to bridge the gap between the lower edge of the hopper wall and the conveyor belt. Such aprons or skirts are normally mounted so as to be adjustable and/or replaceable to accommodate for wear and damage to the skirts by the conveyor belt and the particulate material.

Efforts to minimize wear, for example by increasing the durometer of the skirt material or increasing the pressure by which the skirt material bears against the conveyor belt, tend to score the conveyor belts and wear grooves into the conveyor belt where the conveyor belt is contacted by the skirt. Resilient mounting of the skirt has not been a satisfactory solution.

Skirtboards between the lower edge of the hopper and the conveyor are shown in various prior patents. In most cases, the skirtboard is mounted on the hopper wall for vertical adjustment, and the operation of the conveyor must be arrested when the skirtboard is adjusted to compensate for wear or damage. In the Stahura U.S. Pat. No. 4,236,628, there is disclosed an adjustable mounting for the skirtboard which affords adjustment of the skirtboard without the need for stopping the conveyor. In all of the prior art devices, the adjusting mechanism for the skirtboard tends to become clogged with dust or other foreign matter from the particulate material being fed through the hopper channel, and the adjustability of the skirtboard is impaired.

The present invention is an improvement upon the skirt-mounting arrangement of the type shown in U.S. Pat. No. 4,236,628. A commercial embodiment of this invention has been made available by Martin Engineering Company under the trademark "TRAC-MOUNT" in which the skirtboard is in the form of a series of interengaged rubber blocks which are individually adjustable in metal tracks so that the skirting may conform to the varying profile of the conveyor belt. Such devices are not entirely satisfactory in view of the tendency of the rubber blocks to wear grooves into the conveyor belts and the frequent occurrence of build-up of material causing the blocks to disengage from their tracks and create gaps in the skirting.

SUMMARY OF THE PRESENT INVENTION

The present invention provides an improved skirting arrangement which enables the hardware of the Martin "TRAC-MOUNT" skirtboard system to be used to support skirtboards in a fashion to avoid grooving of the belt and to remain intact for long periods of use without danger of dislodgment of skirtboard sections.

The skirtboard mounting system of the present invention provides an arrangement which enables facile adjustment of the skirtboards to compensate for wear and to accommodate to varying conveyor configurations.

The system of the present invention is designed to exclude particulate matter from the operating hardware of the system so as to eliminate the tendency of accumulated foreign matter in the hardware to dislodge the components and render them ineffective.

With the foregoing in mind, the present invention provides a novel skirtboard assembly for a conveyor system which is fully effective to maintain the particulate material being conveyed on the conveyor belt and to reduce spillage of the material into the surrounding conveyor system.

More specifically, the present invention provides an improved conveyor skirtboard-mounting system which assures an effective and efficient barrier against the escape of particulate material from a conveyor and enables adjustment of the barrier both toward and away from the conveyor belt to accommodate varying operating conditions.

Even more specifically, the present invention provides a means for mounting a skirtboard on hopper walls of a conveyor system which affords adjustment of the flexible skirt of the board into contact with the conveyor surface, said mounting means affording adjustment of the skirt towards the conveyor belt to compensate for wear and enabling release of the skirtboard for adjustment away from the belt, as required by operating conditions.

In the preferred embodiment of the invention, the skirtboard is mounted on the hopper walls by slide elements mounted in tracks affixed to the hopper walls, the slide elements carrying latching levers adapted to releasably mount the skirtboard in position to engage the conveyor, the latch being releasable to afford adjustment of the skirtboard.

BRIEF DESCRIPTION OF THE DRAWINGS

All of the objects of the invention are more fully set forth hereinafter with reference to the accompanying drawings, wherein.

DESCRIPTION OF THE PREFERRED EMBODIMENT

Figure 1:
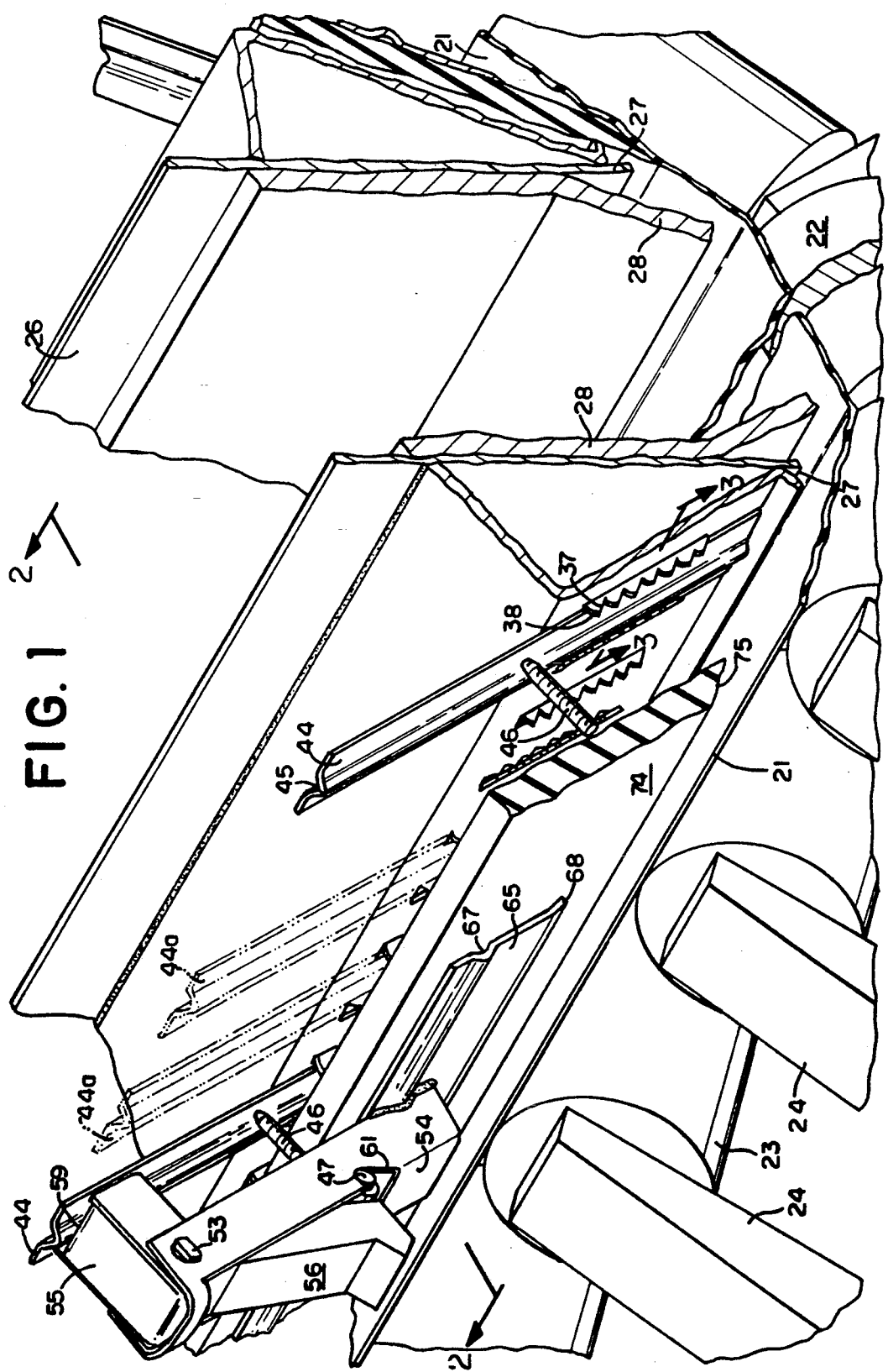
FIG. 1 is a fragmentary perspective view of a conveyor assembly illustrating latching means for mounting a skirtboard along the bottom edges of hopper walls overlying a conveyor, certain parts being broken away to more clearly illustrate the invention.
Figure 2:
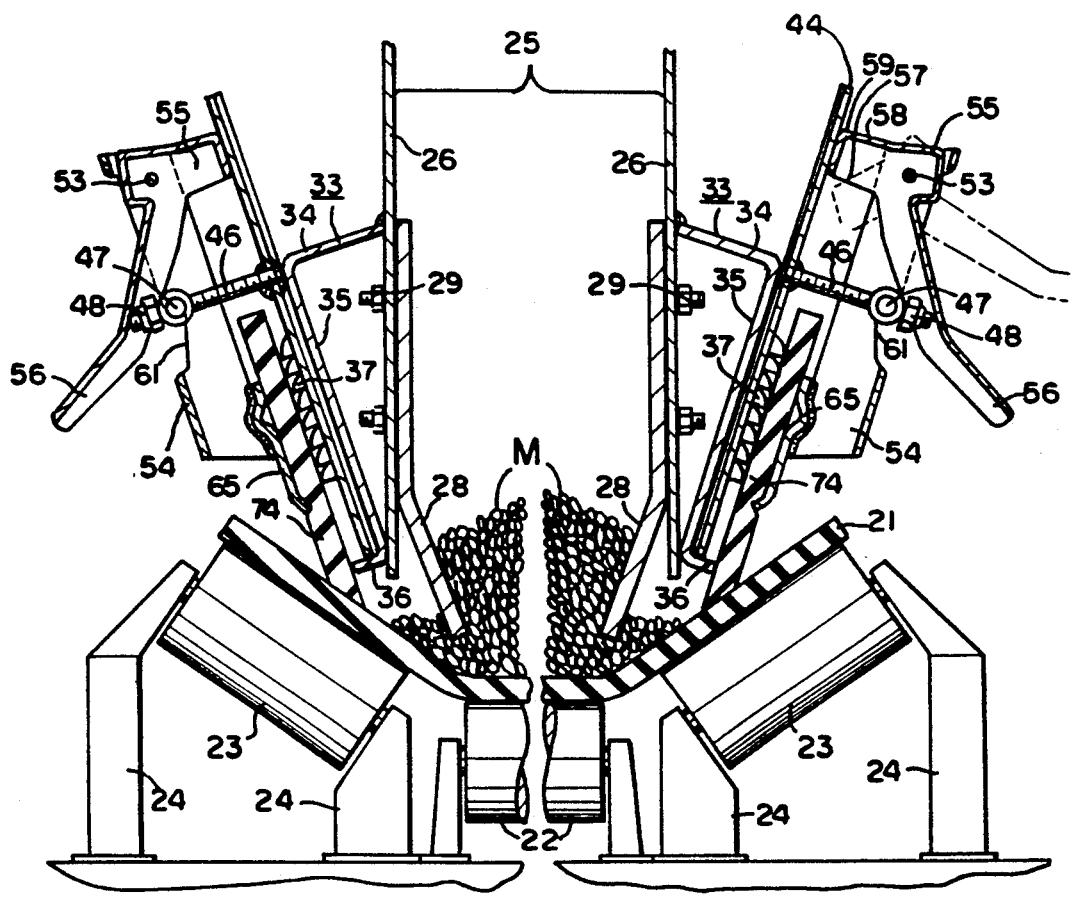
FIG. 2 is a transverse sectional view of the structure, taken on the line 2—2 in FIG. 1.

With reference to the drawings, it should be noted that the drawings comprise a fragmentary illustration of a conveyor assembly in which the center portion of the conveyor is omitted to enable a clear illustration of the opposite sides of the conveyor. The transverse width of the conveyor is determined by the particular conveyor installation. In a typical conveyor assembly for use in gravel pits, grain elevators, and the like, the particulate material is carried on wide conveyor belts which are supported on rollers extending across the full width of the belts. The side edges of the belt are canted upwardly so as to reduce the tendency of the materials to travel off the sides of the belt. The upwardly-canted side edges of the conveyor belt are supported by canted idle rollers. With reference to FIGS. 1 and 2, a conveyor belt is illustrated at 21, and fragmentary support rollers are illustrated under the central part of the belt at 22. As shown, the side edges of the belt 21 are canted upwardly by side support idler rollers 23,23, which are journaled in supports 24 for rotation about inclined axes as shown. Material M is fed to the belt through a hopper channel 25 defined between hopper walls 26,26 extending downwardly and terminating in lower edges 27 spaced upwardly from the conveyor belt so as to avoid interference between the lower edges 27 and the conveyor belt. Wear liners 28 may be mounted on the lower margins of the hopper walls to direct material toward the center of the belt as it is discharged onto the belt through the hopper channel. The wear liner normally is spaced away from the hopper wall to direct material away from the skirt 75 and to limit wear on the bottom edge of the hopper wall 27 resulting from contact with the material being discharged onto the belt.

In the present instance, a skirtboard is adjustably mounted on the outer side of each hopper wall 26 so as to bridge the gap between the lower edge 27 of the hopper wall and the conveyor belt and prevent the migration of particulate material outwardly from under the liner 28. As shown in FIG. 2, the liner 28 is mounted on each hopper wall 26 by fasteners 29 or by welding the fasteners on the outer side of the hopper wall 26 are covered by a Z-plate 33 having an upper leg 34 welded to the outer side of the hopper wall 26, a planar body portion 35 which is inclined downwardly toward the lower edge 27 of the hopper wall 26 and an outwardly-turned lip 36 disposed substantially perpendicular to the planar wall 35.

Figure 3:
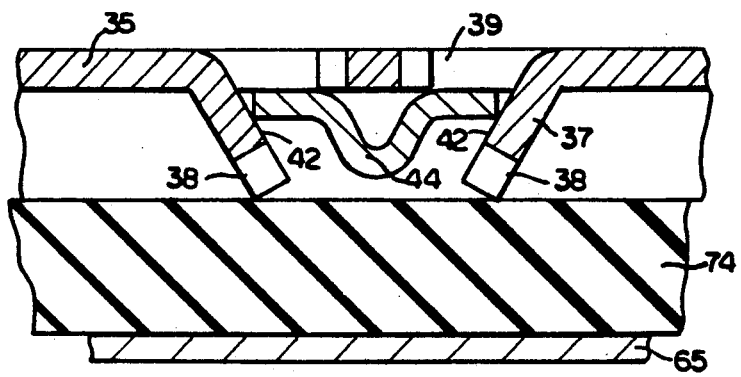
FIG. 3 is an enlarged transverse sectional view through a track for mounting the skirtboard on the hopper wall.

Preferably, the Z-plate 33 extends along the full length of the hopper wall 26 and has a series of lugs 37 (see FIG. 1) pressed out of the planar body section 35. The lugs terminate in ratchet teeth 38. As shown in FIG. 3, the lugs 37 are struck out from the body of the planar section 35 of the Z-plate 33 to leave apertures 39 in the Z-plate. The lugs 37 are arranged in pairs which converge toward one another as shown in FIG. 3 to form a hollow trackway 42 enclosing the elongated apertures 39 on the outer surface of the planar body portion 35 of the Z-plate 33. The hollow trackways 42 are spaced apart at uniformly-spaced locations along the length of the Z-plate 33.

In accordance with the invention, a slide member 44 is mounted in the trackway so as to be slidable longitudinally within the track. As shown in FIG. 1, the slide members are longer than the height of the planar body portion 35 of the Z-plate so that when their ends bear against the outwardly-extending lip 36 of the Z-plate, their upper ends extend above the upper leg 34 of the Z-plate. The slide members 44 are rigid strips of steel or the like, preferably having a central rib extending longitudinally thereof to provide reinforcement against bending therealong. The rib is operable to project outwardly between the teeth 38 when the rigid strip 44 is slid into the trackway 42 between the lugs. Midway of the slide strip 44, a threaded fastener 46 projects outwardly from the rib 45 and terminates in a transverse pivot shaft 47 threadedly adjustable on the fastener 46 as indicated at 48. A bracket 54 is pivotally mounted on the axle 47 and pivotally supports at 53 adjacent its upper end a cam lever 55 having a handle 56 and a pair of cam surfaces 57 and 58 separated by a high point 59.

As shown in FIG. 1, the Z-plate has a number of trackways 42 at equally spaced positions along its length and the slide elements 44 mounting the fasteners 46 are positioned in end trackways 42 which are spaced apart by several intervening trackways, in the present instance three. In order to limit the invasion of foreign matter into the space behind the body portion 35 of the Z-plate 33, the intermediate trackways 42 are closed by inserting strips indicated in broken lines at 44a into the empty trackways. The strips 44a serve to block the apertures 39 formed in the body portion 35 of the Z-plate by the upsetting of the lugs 37. The strips 44a may be identical to the slide strips 44, but preferably strips without fasteners 46 are provided for use in this way.

The brackets 54 mounted on the pivot axles 47 of the spaced-apart slides 44 shown in FIG. 3 are interconnected by a strut 65 which is welded to the lower ends of two brackets 54 (only one of which is shown in FIG. 1). The strut 65 comprises a metal strip having a longitudinally-extending rib 67 and a lower edge 68 which is angled downwardly toward the lower edge 27 of the hopper wall 26. A resilient skirtboard 74 is positioned between the strut 65 and the teeth 38. The skirtboard 74 is formed of a resilient material and terminates at its lower edge in a flexible skirt 75 which may bear against the upwardly-sloping edges of the conveyor belt 21. Depending upon the character of the particulate material conveyed by the belt, the pressure against the conveyor belt may be adjusted between a firm pressure and a very light pressure or even a small clearance, if desired.

The skirtboard 74 is held in place by the levers 55. When the lever is pressed down to the position shown in full lines in FIGS. 1 and 2, the cam surface 57 bears against the slide 44 to pivot the bracket in a direction to drive the lower end of the bracket 54 toward the slide 44, thereby pressing the strut 65 and the skirtboard 74 inwardly toward the hopper wall 26 and the outwardly-projecting teeth 38 struck out from the planar body portion 35 of the Z-plate 33. The inward pressure of the strut 65 against the outer surface of the skirtboard 74 presses the board against the teeth 38 so as to firmly clamp the skirtboard between the strut 65 and the teeth 38.

When it is desired to release the board and to relieve the pressure between the skirt 75 and the conveyor 21, the handle 56 of the lever may be lifted, as shown in broken lines on the righthand side of FIG. 2, as to allow the cam surface 57 to disengage the slide 44 and allow the bracket to pivot on the axle 47 so as to relieve the pressure of the strut 65 against the outside surface of the skirtboard 74. With the pressure released, the skirtboard 74 may be adjusted either upwardly or downwardly, or even sideways, as desired. It should be noted that in order to displace the lever to its broken line position on its pivot 53, the high point 59 of the cam surface must slide on the slide 44 and the resilience of the skirtboard bearing against the lower end of the bracket resists the pivotal movement of the lever as it moves the surface 57 away from the slide 44 and the surface 58 into confronting relation with the slide 44. Thus, there is an over-center locking of the lever in the operative position shown in full lines in FIGS. 1 and 2.

The sliding fit of the slides 44 in the trackways 42 provided by the lugs 37 enables the slides 44 to be mounted on the hopper wall and bottomed against the outwardly-directed lip 36 at the lower end of the Z-plate 33. The axles 47 on the studs 46 projecting from the slides 44 provide a pivotal support for the brackets 54 in registry with the slides 44. As shown, the brackets 54 have a socket cutout at 61 to engage the axles 47 so that the bracket may hang on the pivotal axle 47 both when the clamp lever 56 is engaged with the slide 44 and when it is released. This releasable connection of the brackets on the studs of the fasteners 46 enables the brackets 54 which are interconnected by the struts 65 to be lifted out of engagement with the slides when replacing the skirtboards 74 which are subject to wear and normally require periodic replacement. When replacing the skirtboards 74, the fresh skirtboard is positioned between the teeth 38 and the strut 65 with limited clearance of the skirt portion 75 above the upwardly-facing surface of the conveyor belt 21. The lever handle 56 is then operated to provide some pressure on the skirtboard 74 and the board is then adjusted relative to the conveyor to provide the desired pressure of the skirt 75 of the skirtboard 74 against the upper surface of the conveyor 21. The particular arrangement shown in the drawings provides a facile replacement of the skirtboard and enables the desired adjustment of the skirt pressure against the conveyor.

The present clamping system is an improvement upon the arrangement shown in U.S. Pat. No. 4,236,628 not only by facilitating the replacement and/or adjustment of the skirting, but also because the present invention enables the use of a wide variety of skirtboard material ranging from a relatively low durometer elastomer to a high durometer elastomer, and also permits the substitution of non-elastomeric components. Furthermore, the skirtboards may be removed and replaced without damaging the skirtboard and without adversely affecting the clamping engagement of the skirtboard with the hopper wall.

A preferred embodiment of the present invention has been herein illustrated and described, but it is not intended to limit the invention to such disclosure but changes and modifications may be made therein and thereto within the scope of the following claims.

I claim:

1. In a conveyor system having a conveyor belt, means to cause said conveyor belt to travel in a predetermined path having a substantially horizontal segment, and means to confine particulate material to said segment, said confinement means including horizontally-spaced hopper walls overlying said belt segment and defining a hopper channel between the inward sides of said walls, said hopper walls terminating in lower edges at a distance above said belt segment to provide clearance space at each side of the belt to afford travel of the belt below said hopper walls, and skirt means mounted on said hopper walls, projecting into said clearance spaces, and terminating in flexible sealing flaps confronting the upper surface of said belt to limit the flow of particulate material from said hopper channel outwardly beyond said hopper walls, said hopper walls have upwardly-directed guide tracks on their outward sides, elongated slide means engagable with each track mounted for longitudinal displacement along the associated track, said tracks having longitudinally-spaced opposed retainer means operable to retain said slide means against outward displacement from said track, and anchor means to limit longitudinal displacement of said slide means along said tracks, said slide means supporting said flexible skirt means, said skirt means comprising a skirt board extending transversely to and between adjacent slide means to position said flexible sealing flaps in confronting relation to said conveyor segment, the improvement wherein:

said slide means comprises an elongated rigid element slidable along said track means, a bracket pivotally supported by said rigid element and mounting said skirtboard, and latch means to forcibly engage said skirtboard with the hopper wall adjacent the lower edge thereof, whereby said skirt means is projected into the clearance between said lower edge and said conveyor segment, and said skirt sealing flap confronts said conveyor.

2. The improvement according to claim 1 wherein said guide tracks are formed in Z-plates fixed to the outward sides of said hopper walls and providing a planar surface converging downwardly relative to the associated hopper wall toward its lower edge, each Z-plate having parallel lugs standing out from said planar surface to form said track therebetween, said longitudinally-spaced opposed retainer means comprising teeth at the outer ends of said lugs projecting toward the opposite lug to form a hollow trackway for the rigid element of said slide means, said slide means including a central rib projecting from said rigid element between said teeth and supporting an outwardly-directed fastener terminating in pivotal mounting means for said bracket.

3. The improvement according to claim 2 wherein said latch means is constructed to pivot said bracket on said mounting means to forcibly engage said skirt board with said teeth and limit sliding displacement of said rigid element in said hollow trackway.

4. The improvement according to claim 3 wherein said bracket comprises a member having upper and lower ends aligned with said track respectively above and below said pivotal mounting means, said upper end mounting said latch means and said lower end engaging said skirt board, said latch including a lever engaging said rigid member to urge said upper end away from said rigid element and said lower end toward said track for said engagement of said skirt board with said teeth.

5. The improvement according to claim 4 wherein said latch lever comprises a cam member pivoted for displacement between clamping and releasing low positions on opposites sides of a high center position, said skirt board being resilient to urge said cam member over said high center position toward one of said clamping and releasing positions.

6. The improvement according to claim 2 wherein said fastener comprises a threaded shank, said pivotal mounting means being threadedly engaged with said shank for adjustment toward and away from said rigid element.

7. The improvement according to claim 6 wherein said pivotal mounting means comprises a pivot axle mounted on said shank and an open-sided socket in said bracket operable to pivotally support said bracket on said axle.

8. The improvement according to claim 2 wherein said lugs comprise tangs punched out of said Z-plate to form apertures in said Z-plate within said hollow trackway, said rigid element being of a size to overlie and block said apertures when latch means forcibly engages said said skirt board with said hopper wall.

9. The improvement according to claim 1 wherein said guide tracks on the outward sides of said hopper walls are numbered greater than three, said skirt boards extending transversely across at least three guide tracks and being forcibly engaged by selected latch means carried by slide means associated with the outside tracks of said numbered tracks, said improvement including rigid strut extending between said selected latch means to maintain said skirt board forcibly engaged with said hopper wall between said selected latch means.

10. The improvement according to claim 9 wherein the outside tracks have rigid elements with latch means, and the tracks between said outside tracks have rigid elements without latch means.

11. The improvement according to claim 9 wherein said rigid strut comprises an elongated strip of sheet material having a reinforcing rib extending longitudinally of said strip centrally thereof.

12. The improvement according to claim 11 wherein said rigid strut is integrally connected to said selected latch at each end of said strut means.

13. The improvement according to claim 12 wherein said rigid strut has a lower margin angled toward the lower edge of the associated hopper wall engaging said skirtboard.

* * * * *

UNITED STATES PATENT AND TRADEMARK OFFICE
CERTIFICATE OF CORRECTION

PATENT NO. : 5,154,280

DATED : October 13, 1992

INVENTOR(S) : George T. Mott

It is certified that error appears in the above-identified patent and that said Letters Patent is hereby corrected as shown below:

Column 8, line 24, the line should read --latch means at each end of said strut.--

Signed and Sealed this

Twenty-first Day of September, 1993

Attest:

BRUCE LEHMAN

*Attesting Officer*   *Commissioner of Patents and Trademarks*